United States Patent [19]

Williams et al.

[11] Patent Number: 5,254,415
[45] Date of Patent: Oct. 19, 1993

[54] STACKED CELL ARRAY BIPOLAR BATTERY WITH THERMAL SPRAYED CONTAINER AND CELL SEAL

[75] Inventors: Mark T. Williams, Hampstead; James D. Briscoe, Westminister; Salah M. Oweis, Ellicott City, all of Md.

[73] Assignee: Saft America Inc., Cockeysville, Md.

[21] Appl. No.: 865,471

[22] Filed: Apr. 9, 1992

[51] Int. Cl.$^5$ .................. H01M 6/46; H01M 2/08; H01M 1/18; H01M 4/36
[52] U.S. Cl. ................... 429/153; 429/174; 429/185; 429/155; 429/199; 429/218; 429/210; 429/207; 429/221; 429/223
[58] Field of Search ............. 429/155, 199, 112, 221, 429/210, 207, 152, 153, 154, 223, 174, 185, 218

[56] References Cited

U.S. PATENT DOCUMENTS 4,687,717 8/1987 Kaun et al. .................. 429/152
5,162,172 11/1992 Kaun ........................... 429/185 X

*Primary Examiner*—John S. Maples
*Attorney, Agent, or Firm*—Sughrue, Mion, Zinn, Macpeak & Seas

[57] ABSTRACT

A high-temperature bipolar battery consisting of a plurality of stacked individual cells. A first, thermal-sprayed electrode or electrolyte resistant material ceramic layer is sprayed to the exterior of the face-to-face stacked array and onto the peripheral faces of the battery metal end plates remote from the individual cells of a thickness sufficient to virtually eliminate all through pores therein. A second thermal-sprayed ceramic layer is of a thickness sufficient to form a metal support and containment structure of the bipolar battery stack. The thermal-sprayed layers have similar coefficients of thermal expansion (CTE). A metal cup surrounds and encloses at least one of the electrodes of each individual cell tending to form an inter-cell seal between the thermal-sprayed ceramic layer and the metal cup to prevent communication of electrolyte from cell to cell. Preferably the cups and any screens between the electrolyte layer and the anodes and cathodes of the respective cells extend radially beyond the electrodes and are embedded in the thermal-sprayed ceramic layer. The thermal-sprayed ceramic layer may be MgO of 20 mil. thickness and the thermal-sprayed metal layer may be 410 stainless steel of 50 mil. thickness.

24 Claims, 4 Drawing Sheets

STACKED CELL ARRAY BIPOLAR BATTERY WITH THERMAL SPRAYED CONTAINER AND CELL SEAL

FIELD OF THE INVENTION

This invention relates to a stacked cell array bipolar battery for use at high temperature, and more particularly to a lithium alloy/metal sulfide battery in which the stacked array of cells is spray-coated with a ceramic seal coating followed by a metallic containment structural coating to maintain the structural integrity of the stacked cell array during high temperature use.

BACKGROUND OF THE INVENTION

Lithium alloy/iron sulfide bipolar stacked cell batteries have positive and negative electrode materials confined relative to structural positive and negative current collectors which are electrically insulated from one another by separators. The negative electrode material may be a lithium alloy (LiAl); the positive electrode material may be iron sulfide ($FeS_1FeS_2$). The separator may be formed of a powder magnesium oxide (MgO). Typically, the electrolyte may be a lithium chloride, lithium bromide, and potassium bromide mixture (LiCl-LiBr-KBr). Current collectors of electrically conductive sheets also function to confine the electrode materials.

Batteries comprised of multiple cells grouped together face to face, and electrically connected in series, are capable of very high current density and have high energy density. Such batteries operate at temperatures ranging from 350° C. to 500° C. At such temperatures, the electrode materials and electrolyte are highly corrosive so that the current collectors must be corrosive resistant while electrically conductive. Such batteries are required to have long operating life in excess of 1000 "deep discharge" cycles. During such cycling, the positive and negative electrode materials undergo volumetric changes, thereby shifting the electrode materials within the battery cell. This can result in deformation of the separators.

Additionally, electrolyte leakage has been experienced between positive and negative electrodes of adjacent cells.

In the past, compression of the stacked and sandwiched cell components within an exterior battery case has been employed to maintain the separator sealed at its peripheral edge. Attempts at hermetic sealing of the bipolar battery have been ineffective.

Attempts have been made to overcome such problems in high temperature lithium alloy/iron sulfide bipolar batteries as exemplified by U.S. Pat. No. 4,687,717 issued Aug. 18, 1987, to Thomas D. Kaun et al. and entitled "Bipolar Battery with Array of Sealed Cells."

In U.S. Pat. No. 4,687,717, the problem has been met by forming initially a plurality of cell and closing assemblies, each comprised of an electrolyte separator sheet, a pair of perforated metal sheets on opposite sides of the separator sheet, with the perforations being within a predetermined perimeter, and an insulating member between and sealed to the metallic sheets and about the perimeter to enclose the separator sheet at the perimeter, providing electrolyte to fill each electrolyte cavity, inserting the electrically opposite electrodes on the perforated metal sheets on sides opposite the separator sheet, assembling the cells and cell enclosures in an array with a current collector sheet between adjacent cells, and an end face cap on each opposite end of the array. The assembling step includes sealing each metal sheet to an adjacent current collector sheet or end face cap to enclose the adjacent electrode. Finally, the array is enclosed within an external housing and electrical connections are provided to electrically opposite ends of the array.

Such approach is characterized by the formation of cup-like electrode holders via the peripheral edges of the sheets which project outwardly beyond the spacer and traverse the side edges of adjacent electrode material and fusing the cuplike electrode holders to the adjacent current collector or end face members of the array.

Such approach to hermetic sealing of the bipolar battery by forming thermal compression seals for each cell is expensive and time consuming. Besides, that approach still requires the stacked array to be placed in an external housing or container which functions to enclose the array and provide electrical connection to the electrically opposite ends of the array.

An attempt has been made to further improve such bipolar battery cell, having thermal compression seals for each cell, with leak proof, sulfide ceramic seals of the positive and negative electrode materials, where the seals adjacent the electrolyte cavity or chamber are formed prior to the addition of electrolyte where the repeating, cup-like design of the battery allows the battery components to be assembled incrementally from the open end of a sealed external container or housing, wherein telescoping seal elements capture the periphery of the separator of each cell to enhance cell durability, where the battery current collector element or collector elements are of diaphragm form and displaceable to accommodate changes in electrode volume during electrical charging and discharging cycles, where refractory metal-coated steel components contain the electrodes, where the bipolar battery structure has a combination of external ceramic rings and sealants at each cell to resist humidity and provide electrical insulation, and where high strength bonds between metals and sulfide ceramics have employed modification of the bond interface to form an intermediate material such as an aluminide, silicide, or phosphide.

While such approaches have been capable of alleviating the leakage of electrolyte at high temperature operation of the bipolar batteries and the maintenance of the structural integrity of the bipolar battery, the requirements of sealing the periphery of cup-like cells of the stacked array, the necessity for individual leak-proof ceramic seals for each cell of the stack, and the necessity of a cell enclosure for the stacked array of cells increases greatly the cost of the bipolar battery, the complexity and structure, and the time and effort in the manufacture of such bipolar batteries.

It is, therefore, an object of the invention to provide an improved bipolar battery which eliminates the need for individual leak-proof sulfide ceramic seals for the individual cells, eliminates the necessity of a repeating cup-like cell configuration and the incremental assembly of the same into a multi-stack array from an open end of a sealed auxiliary support and containment structure, and the elimination of external ceramic rings and sealants to encapsulate the battery to resist humidity and provide electrical insulation.

It is a further object of the invention to accomplish simultaneously the sealing of a plurality of cells of a bipolar battery stack and form a structural container for maintaining the stack under compression which is stable, and capable of absorbing thermal-induced expansion of the cell components during battery operation and cyclic drain and recharging all at high operating temperatures, in a single low-temperature operation, which forms an inter-cell seal preventing the flow of electrolyte from cell to cell at elevated temperatures and over long periods of time, and which locks in cell dimensions.

SUMMARY OF THE INVENTION

A bipolar battery multi-cell stack is thermal (e.g., plasma) sprayed with a lithium and $FeS_2$ resistant ceramic layer of a thickness sufficient to eliminate all through pores. A metal layer is plasma/thermal sprayed over the ceramic to a thickness sufficient to provide structural support and containment. Preferably, at least one electrode component of each cell is surrounded and enclosed by a metal cup. An inter-seal is formed between the ceramic layer and the metal cup, preventing communication of electrolyte from cell to cell. The stack is preferably held in compression during layer application and solidification and during use. A metal end plate of disc form is preferably coated as a part of the stack with the coating covering the sides and a portion of the metal end plate facing away from the stacked cells. The battery is hermetically sealed and the end plates are partially exposed for electrical connection to the battery. The ceramic layer provides a leak-tight hermetic seal with the cups of each cell, which remains hermetic through thermal cycles from ambient temperature to battery operating temperature (375°–500°C). The plasma-sprayed metal outer layer is selected to provide a coefficient of thermal expansion (CTE) sufficient to maintain a perfect fit to the ceramic layer during thermal cycling. Preferably, the end plates, electrode cups and outer metal layer are all of the same metal or different metals with CTEs sufficient to maintain an established seal with the ceramic layer. Alternatively, graded layers are built up by spraying materials and mixtures of materials having different CTEs such that the CTE varies gradually from the ceramic layer to the metal. Li and $FeS_2$ resistant ceramics may constitute one material from the group consisting of $Li_2S$, CaS, SrS, BaS, $Li_2O$, BeO, MgO, CaO, SrO, $Ba_2O$, $Li_3N$, $Be_3N_2$, $Mg_3N_2$, $Ca_3N_2$, $Sr_3N_2$, $Si_3N_4$, BN, AlN, $Ca_3Al_2O_6$, $CaHfO_3$, $SrAl_2O_3$, and SiAlON and mixtures thereof.

If the ceramic layer is not perfectly free of through holes, a thin layer of Mo or other corrosion resistant material is applied to the ceramic layer and the outer metal layer sprayed over the Mo layer.

The electrolyte for each cell may comprise alkali and alkaline earth metal salts and mixtures of same, preferably mixtures of alkali halides, containing substantial portions of lithium halides, such as LiCl-KCl, LiF-LiCl-LiBr, LiCl-LiBr-KBr. The cathode for each cell may comprise chalcogens and transition metal chalcogenides, preferably transition metal sulfides or oxides such as $V_2O_5$, $TiO_2$, $LiCoO_2$, $LiNiO_2$. $MoS_2$, FeS, $FeS_2$. $NiS_2$. $CoS_2$, $NiS$, $CoS$, and mixtures of such chalcogenides present in either the charged or uncharged state. The anode for each cell may comprise alkali or alkaline earth metals, their alloys or intercalates, preferably lithium or its alloys or intercalates such as LiAl, LiSi, LiAl-Fe, LiAl-Si, LiAl-Co, LiAl-Ni, lithium intercalated into carbon or graphites, etc., or mixtures of one or more such metals, alloys, and intercalates.

Preferably the metal cups for the electrodes and the screens extend radially outward beyond the cell stacked array so as to be embedded in the ceramic layer, thus fixing the components of the cells in position with respect to the other elements of the stack. The cups constituting the metallic current collectors may be metal diaphragms which collapse and expand axially to conform to volume change of the electrodes during thermal cycling.

In a preferred embodiment, the ceramic layer may constitute MgO, the metal parts of the battery may be formed of 410 stainless steel or hastelloy B. The positive electrode $FeS_2$ and the negative electrode may be enclosed in a metal cup of 410 stainless steel. The positive cup, if formed of 410 stainless steel, is coated with a conductive material that is resistant to the corrosive effects of $FeS_2$. The negative electrode may be enclosed in such metal cup and the outside of the metal enclosed cup of the negative electrode and should be coated with a conductive layer that is corrosion resistant to $FeS_2$. Alternatively, the ceramic plasma-sprayed layer may be AlN and the metal components of the battery cells including the metal cups may be formed of Mo. The end plates or terminals may also be formed of Mo with the outer plasma-sprayed layer of the ceramic sealant, metal support and containment structure of plasma-sprayed Mo.

DESCRIPTION OF THE PREFERRED EMBODIMENTS

Generally, the bipolar battery of this invention comprises a plurality of individual cells in a vertically-stacked array. Electrically opposite electrode ends of the individual cells are adjacent each other in the array and electrically conductive terminals extend from opposite plurality electrode ends of the vertically-stacked array. Each cell generally includes a pair of electrically opposite electrodes in contact with and separated by a separator element with a current collector positioned between and in electrical contact with adjacent electrodes of adjacent cells. Such content is conventional in such high temperature batteries, particularly cells which are capable of very high current density and where the battery is designed to operate at temperatures in the range of 375° C. to 500° C.

The bipolar battery stack is first sprayed by a plasma or other thermal spray technique with a lithium and iron sulfide resistant ceramic to a thickness sufficient to eliminate all through pores. A second metal layer is similarly sprayed by a plasma or other thermal spray technique over the ceramic layer to a thickness sufficient to provide structural support and containment for the battery stack under high operating temperature operation. This multi-layer thermal-sprayed containment structure contains all cell components such an anode, electrolyte, cathode, and current collector, and form an inter-cell seal to prevent flow of electrolyte from cell to cell at elevated temperatures and for long periods of time.

Figure 1:
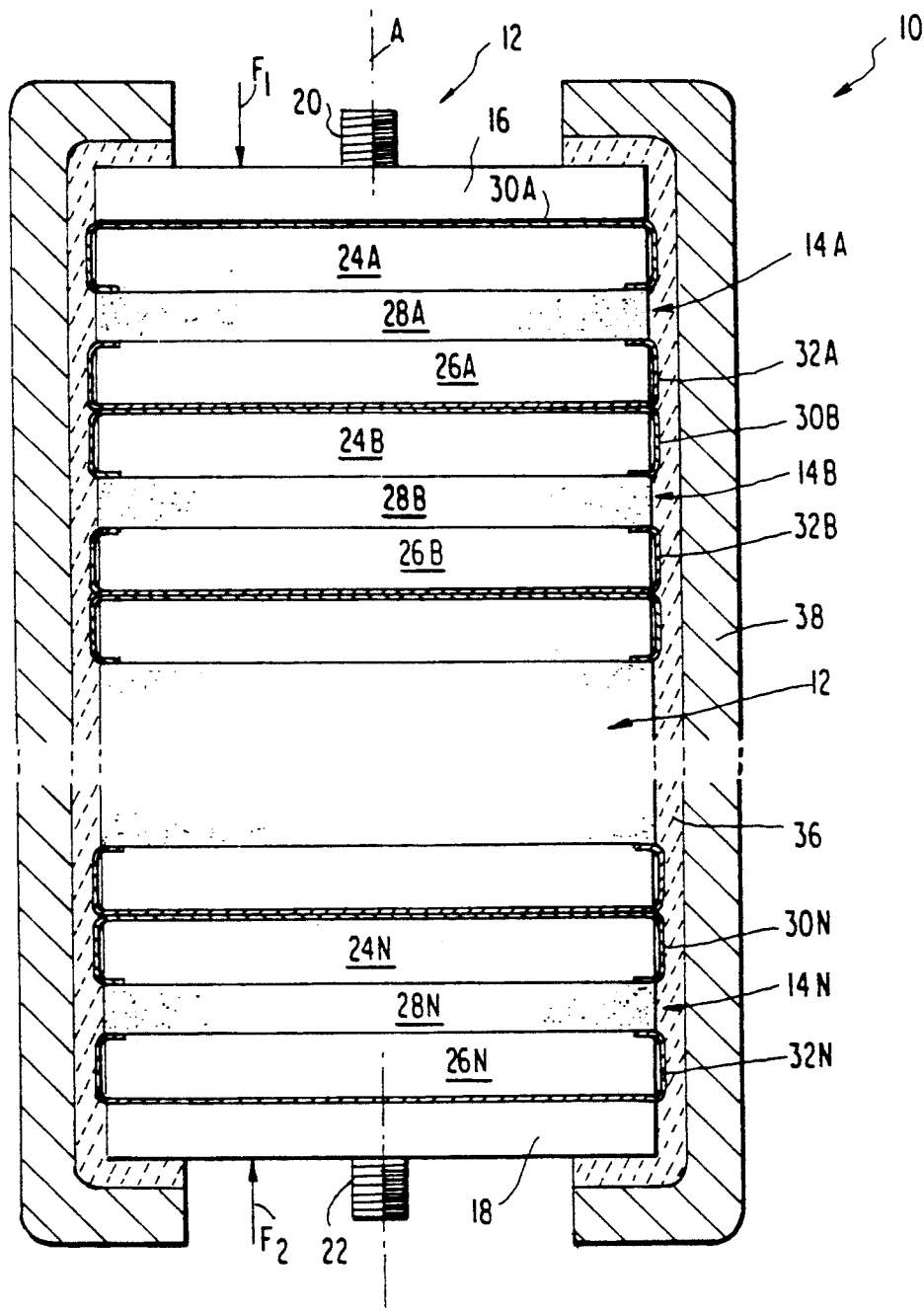
FIG. 1 is a schematic, vertical sectional view of a bipolar, multi-cell lithium alloy/metal sulfide battery forming a first embodiment of the invention.
Figure 2:
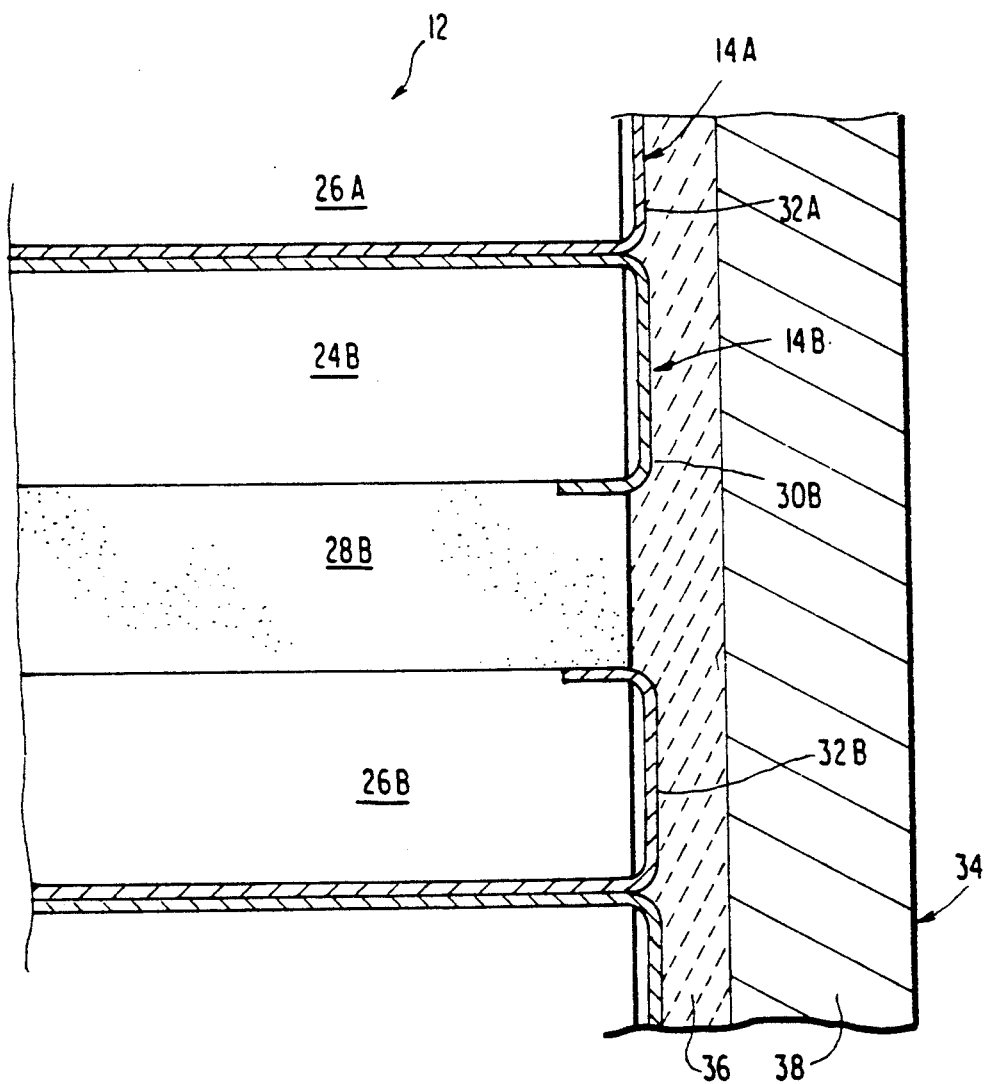
FIG. 2 is an enlarged schematic, sectional view of a portion of the bipolar battery of FIG. 1 on a larger scale.

As shown in FIGS. 1 and 2, a high-power, high operating temperature lithium alloy/iron sulfide battery 10 of symmetrical cylindrical form having a vertical axis A, is comprised of a vertical stack or stacked array 12 of individual cells 14A, 14B, 14C . . . 14N. The individual cells 14 are sandwiched by an upper metal end plate or terminal 16 and a lower metal end plate or terminal 18 for the stack cell array 12. The cell 14A is electrically connected to positive electrical terminal 16 via the metal end plate 16 with the terminal 16 including a threaded stud 20 integrated thereto, as by being welded or integrally formed with the metal end plate 16. On the bottom, the cell 14N is connected to the positive terminal or end plate 18 to which it may be welded. The metal end plate 16 constitutes a cathode current collector. The voltage across the positive and negative terminals 18, 16 is the cumulative voltage of the cells 14A-N.

Each cell 14A, 14B . . . 14N forming the stacked array 12 has an associated anode electrode 24A, 24B, . . . , 24N, and an associated respective cathode electrode 26A, 26B, . . . , 26N, separated from one another across an associated electrode separator 28A, 28B, . . . , 28N. Current collectors of cup-shape form 30A, 30B, . . . 30N sandwich the outer end face and side of anodes 24.) Further, identical oppositely-oriented cup-shape current collectors 32A, 32B, . . . , 32N sandwich the outer face and sides of the cathodes 26.

Unlike the approaches described in the Background of the Invention, there are no separate cell peripheral seal modules, no peripheral seals for individual cells, and no ceramic support rings or the like. Prior to the assembly operation, electrolyte in pressed powder form has been pelletized into the electrolyte separator elements 28A, 28B, . . . , 28N (and possibly infused into the anodes 24 and the cathodes 26). Such electrolyte may pass by ionic conductance across the separator elements 28 between the anode 24 and cathode 26.

Reference to FIG. 2 illustrates to a larger scale the make-up of the negative electrode, the electrolyte separator and the positive electrode schematically representing an individual cell 14B with the positive 26B and negative 24B electrodes being bound by the metal current collectors 30B, 32B, respectively, clearly showing the lack of ceramic seals for the individual cells and the lack of peripheral seal modules, including spaced-apart electrically-conductive elements and an interposed insulating member as employed by the bipolar batteries within the description of the Background of the Invention portion of the specification above. Such structure as shown in FIGS. 1 and 2 are devoid of ceramic support rings or other peripheral seal components for sealing the individual cells, or as additional structure at the interface between stacked cells and acting on the cells themselves. Nor is there a separate containment structure within which the stacked cell array is disposed.

In contrast to prior lithium-alloy/FeS bipolar batteries of this type, as described herein, with the exception of the cup-like enclosing of the oppositely-directed end faces of the negative electrode 24 and the positive electrode 26 by the metallic current collectors 30, 32 and about the sides thereof, the peripheral portions of the stacked array 12 are fully exposed and unsealed, absent the thermal spray applied dual layer ceramic sealant and metallic structural coatings constituting the improvement within the various embodiments of this invention.

In that respect, in FIG. 1, a fixture (not shown) is employed in maintaining the components of stacked array in the position shown in FIG. 1, with adequate compressive forces $F_1$, $F_2$ as shown by the opposed arrows at the upper end of the stacked array and the lower end of the stacked array during spraying and spray coating solidification and during battery use at high temperatures. The fixture maintains the stacked array under compression during the thermal spray application of the ceramic sealant and metal containment structural coatings, FIG. 1. The dual layer thermal-sprayed sealant and containment structure 34 comprises a first inner layer 36 which is a lithium and $FeS_2$ resistant ceramic material compatible with the content of the negative electrodes 24 and the positive electrodes 26 of the individual cells 14A, 14B . . . 14N.

As a specific example of the makeup of the bipolar battery of the embodiments of the invention of the various figures, preferably the negative electrode material is a lithium alloy such as LiAl, LiSi. The positive electrode material is $FeS_2$ or FeS. The separator element is preferably a prepared pressed powder magnesium oxide (MgO) or aluminum nitride (AlN). The electrolyte may be a lithium chloride, lithium bromide, and potassium bromide mixture and fluid at battery operating temperatures (375°-500° C). Such content is exemplary only and, in accordance with U.S. Pat. No. 4,687,717, the content thereof is incorporated by reference into this application.

Prior to the assembly operation, the electrolyte (not shown) may be infused into the anodes 24 and the cathodes 26 or the separator element 28 of each of the cells of the stacked array 12. A typical technique involves mixing of electrolyte particles with particles of the separator elements 28 and cold-pressing of the mixture into plaques or pellets. Such electrolyte can then pass by ionic conductants across the separator element 28 between the anode 24 and cathode 26 of each cell 14. As will be seen hereinafter, particle retainer sheets or screens may be interposed between the electrodes and the separator (electrolyte) as per the embodiment of FIG. 3 to prevent particle migration. Unlike the bipolar batteries described within the Background of the Invention section of this specification, the stacked cells 14 are not maintained in a compressed state by means of abutment against the inside walls of an external, prefabricated hollow cylindrical housing or cell containment structure. Thus the exterior surfaces of the stacked cell array 12, including peripheral end surfaces of the metal end plates or terminals 16, 18, are free for thermal spray application of the composite sealant and metallic structural spray coating layers 36, 38. In the various embodiments of the invention, as an example of a compatible ceramic sealant to be thermal sprayed to the exterior surfaces of the stacked array 12, the lithium and $FeS_2$ resistant ceramic is MgO thermal sprayed by a plasma spray or other equivalent thermal spray technique to a thickness sufficient to eliminate all through pores. Layer 36 thus hermetically seals the bipolar battery stack 12 with a non-metallic ceramic coating acting as a sealant. After the plasma or other thermal spraying of the ceramic layer 36, which is applied about all the peripheral surface of the circular, cross-sectional configured bipolar battery 10, a metal layer 38 of 410 stainless steel is sprayed by the same thermal spray technique which may be plasma (or other equivalent thermal) spray over the ceramic layer 36 to a thickness sufficient to form a mechanically, structurally stable containment layer 38 capable of resisting heat-developed interior forces, tending to expand the battery, particularly during high temperature battery operation over a number of cycles from full charge to near 95% drain down of the battery.

The only limitations in thermal spraying of the layers 36, 38 of the thermal-sprayed ceramic sealant and metallic containment structure 34 include a temperature limitation, one which is less than the melting temperature of the electrolyte. The result is the accomplishment of simultaneously sealing of the periphery of numerous cells 14A, 14B, . . . 14N in one stack 12 and forming a containment structure all in one single, relatively low temperature operation. Further, the coefficients of thermal expansion (CTE) of the material or materials of layers 36, 38 should be sufficiently related to each other and to that of the metal components of the cells to provide a seal therebetween.

The thermal-sprayed, dual-layer ceramic sealant and metallic containment structure 34 contains all cell components, i.e., anodes 24, electrolyte/separator 28, cathode 26, and current collectors 30, 32, form an inter-cell seal over the complete vertical extent of the stack 12 to prevent flow of electrolyte from one cell 14 to another at elevated temperatures and for long periods of time and having sufficient strength to lock in cell dimensions irrespective of high temperature deep cell cycling.

Figure 3:
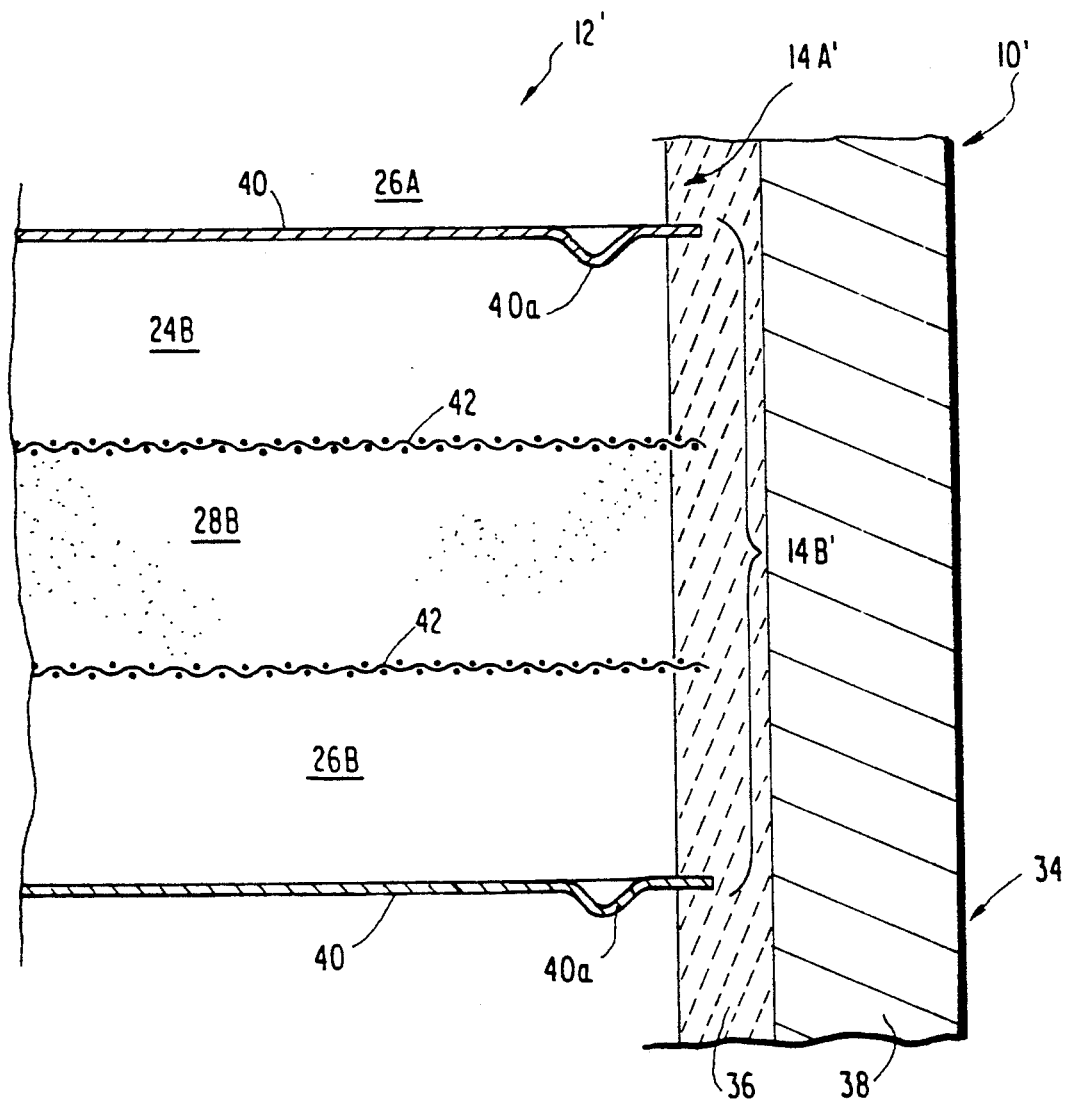
FIG. 3 is a schematic, vertical sectional view of a portion of a multi-cell, lithium alloy/metal sulfide bipolar battery forming a second embodiment of the invention.

FIG. 3 shows a second embodiment of the invention as an enlarged scale view of an equivalent bipolar battery 10 which is very similar to that of the first embodiment 10, FIGS. 1 and 2. A single cell 14B' is illustrated in face-to-face contact with an adjacent, upper cell 14A' as a part of a stacked cell array 12'. Again, each cell is formed of an upper, negative electrode 24B, separator electrolyte 28B, and positive electrode 26B. In the multiple embodiments of this invention, the same elements have the same numerical designations.

In this embodiment, a single metallic current collector 40 is interposed between the negative electrode 24B of cell 14B' and the positive electrode 26A of cell 14A'. Likewise, a common metallic current collector 40 of identical form and size is employed at the bottom of cell 14B' and interposed between the positive electrode (cathode) 26B of that cell and the next underlying cell of the stacked array 12'.

Each metallic current collector 40 takes the form of a diaphragm providing a vertical reciprocating action during battery cycling with the common metallic current collector 40 electrically connecting each cell of the stack 12' to the next one in the stack and functioning to align the cell components for effective sealing by thermal spray-applied MgO ceramic inner layer 36 of the ceramic sealant, metallic thermal-spray containment structure 34 identical to that of the first embodiment FIGS. 1 and 2. Further, the materials making up the anodes 24, the separators 28, and the cathodes 26 of the individual cells in this embodiment, may be identical to the example of FIGS. 1 and 2. The same operating perimeters also apply.

In this embodiment, to the metallic current collectors 40 take the form of a disc-shaped diaphragm, including an annular convolution or V-shaped indentation 40a extending radically over some width to opposite sides and adjacent the side of the stacked array 12'. This provides the advantageous effect that, as the battery 10' cycles, said bipolar metallic current collector or plate 40 will perform like a diaphragm and "oil can," that is, pop back and forth slightly as a result of the volume change of the two adjacent electrodes, i.e., the positive electrode such as cathode 26A of cell 14A' and the anode 24B of the underlying cell 14B'. The addition of a peripheral corrugation or fold into the bipolar plate or metallic current collector 40 enhances this action. As may be appreciated, the change in volume exerts both vertical forces or stresses on the stacked array 12', as well as those peripherally or radially applied against the ceramic/metal thermal-sprayed peripheral and axial end structure 34. The popping action and slight deflection of the bipolar plates or metallic current collectors 40 tend to alleviate the mechanical stresses.

The embodiment of FIG. 3 additionally utilizes particle retainer screens 42 interposed between each electrolyte separator 28, and the facing end of the anode 24 and cathode 26, as seen within the illustrated cell 14B'. The diameter of the particle retainer screens or sheets 42 are in excess of that of the electrodes 24, 26 of each cell and the radial peripheries are encapsulated by the thermal spray-applied lithium and $FeS_2$ resistant ceramic layer 36, along with the peripheries of the larger diameter bipolar plates or metallic current collectors 40.

Since the electrodes 24, 26 undergo appreciable volume change during the cyclic discharge and recharge of the battery, the upper-plateau $FeS_2$ electrode has larger solids volume at the end of its discharge. The electrodes of the alloy/$FeS_2$ cell are designed to be dimensionally stable. Thus the amount of electrolyte in the respective electrodes fluctuates during cycling. By use of the bipolar plate or metallic current collectors 40, having the annular grooves or indents 40a at the perimeter of the plates 40a within dimensionally-confined volume defined by the metal layer 38 of the seal and containment structure 34 as the $FeS_2$ electrode 24B expands, it can borrow volume from the lithium alloy cathode electrode 24, which shrinks during discharge. Upon recharge, the $FeS_2$ positive electrode 26 shrinks and the lithium alloy electrode 24 expands. Under such arrangement, the diaphragm-type bipolar plates or metallic current collectors 40 facilitate the volume increase or decrease of the solids which fluctuate differently for the anode and cathode during cycling. Such reciprocating bipolar plates or metallic current collectors have been found to enhance battery power, particularly of high temperature operating compact batteries such as those at 10 and 10'. The reduced volume enables reduced weight of the battery 10, 10' hardware components.

Since the invention contemplates and requires a fixture for maintaining a stacked, multi-cell component array as at 12, 12' during thermal spray application of the dual layers 36, 38 of the ceramic sealant and metallic component structure 34, during battery construction and during high temperature use in each of these embodiments of the invention, such arrangement provides a basis for further simplifying component fabrication.

Figure 4:
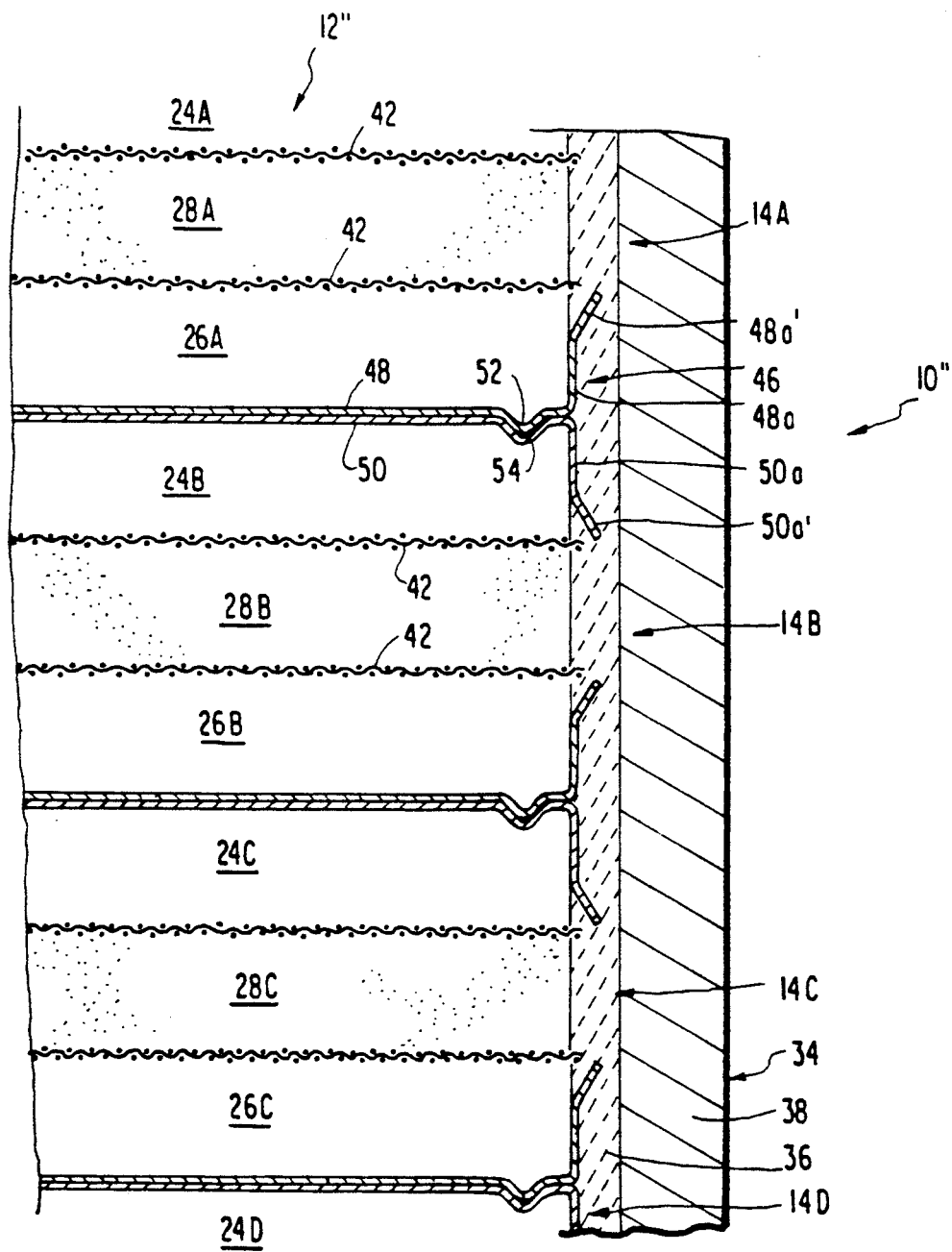
FIG. 4 is a schematic, vertical sectional view of a portion of a multi-cell, lithium alloy/metal sulfide bipolar battery forming at a third embodiment of the invention.

In the third embodiment of the invention, FIG. 4, the environment features the employment of a double bipolar plate or metallic current collector assembly 46 interposed between each of the cells of a stacked array. In this case, the multi-cell bipolar battery 10' utilizes a series of stacked cells formed of prepositioned, stacked components as an initial stacked array 12". The enlarged scale schematic vertical sectional view of FIG. 4 illustrates only a portion of the upper-most cell 14A, the entirety of succeeding cells 14B and 14C, and only a portion of a further, lower succeeding cell 14D. The cell components, i.e., anodes 24, cathodes 26, and electrolyte separator 28, are identical to that of the embodiment of FIG. 3, screens 42 interposed between the electrolyte separator 28 and the anode and cathode of each cell. Such components have like numerical designations to those within the embodiment of FIG. 3. Further, insofar as the ceramic sealant metallic confinement structure is concerned, the coating layers 36 and 38 are identical to those of the prior embodiments, applied in the same manner by a thermal spray technique such as a plasma spray with the same temperature limitations, utilizing the same material, and the material content for the separator electrolyte 28 and the anode and cathode 24, 26 as in the previous embodiments.

In this embodiment, the structural difference resides in the makeup of the double bipolar plate or double metallic current collector assembly indicated generally at 46 with each double bipolar plate assembly being interposed between adjacent stacked cells 14A, 14B, 14C, 14D, . . . 14N. Each double bipolar plate assembly 46 is formed of mirror image bipolar plates 48, 50, which are of cup-like form having vertical cylindrical sides as at 48a, 50a, which project generally at right angles to the bottom and top of the respective bipolar plates 48, 50. Such sides terminate in outwardly oblique, flared ends as at 48a' and 50a', respectively, facilitating the positioning of the respective cathodes 2 and anodes 24 within the same. The bipolar plate 48 is provided with an annular indentation 52 within an outer peripheral portion of the flat horizontal wall thereof. Correspondingly, the inverted bipolar plate 50 has an annular indentation 54 in its bottom surface 52, at the same radius and lying opposite to that of bipolar plate 48 so as to match, with one received in the other 54. Additionally, the outwardly flared ends 48a' and 50a' project into the ceramic sealant material 36 which, when fused or hardened, encapsulates those diverging ends to facilitate the integration and structural integrity of the stacked cell array 12" and the sprayed sealant and containment structure 34 of the battery 10' after its fabrication.

As an aspect for all of the embodiments of the invention, if necessary or desirable, an inter-metallic bonding film may be provided to insure bonding of thermal spray MgO ceramic layer 36 to the 410 steel layer 38. Such thin film inner-metallic may be useful in effecting ceramic seal bonding to the bipolar plate or metallic current collectors interposed between the individual cells of the stacked arrays 12, 12', 12", particularly the diaphragm form of bipolar plates such as 40 of FIG. 3 and 48, 50 of FIG. 4.

The foregoing description of embodiments of the invention have been presented for purposes of illustration and description. It is intended that the invention is not limited to the embodiments described and that modifications and changes may be readily made without departing from the spirit of the invention.

What is claimed is:

1. In a bipolar battery comprising:
a plurality of individual cells with electrode faces in a face-to-face stacked array with electrically-opposite electrode ends, electrically conductive metal end plates in contact with said electrode ends of the array, each cell including a pair of electrically-opposite electrodes in contact with and separated by a central separator comprising an electrolyte, normally fluid during the operation of the battery, said array including at least one current collector between and in electrical contact with adjacent electrodes of adjacent cells, the improvement comprising:
a first, thermal-sprayed electrode or electrolyte resistant material ceramic layer on the exterior of the face-to-face stacked array over the axial length of the stacked array, and onto the peripheral faces of said metal end plates remote from said individual cells, said ceramic layer being of a thickness sufficient to virtually eliminate any electrolyte leakage from each cell, and a second, thermal-sprayed metal layer over said thermal sprayed ceramic layer of a thickness sufficient, forming a ceramic sealant and metal support and containment structure for the bipolar battery stack, and wherein the material forming said thermal-sprayed ceramic layer and that of the thermal-sprayed metal layer having sufficient coefficients of thermal expansion (CTE) to maintain a seal.

2. The bipolar battery as claimed in claim 1, further comprising a metal cup surrounding and enclosing one of the electrodes of each individual cell forming an inner cell seal between the thermal-sprayed ceramic layer and said metal cup to prevent communication of electrolyte from cell to cell.

3. The bipolar battery as claimed in claim 1, wherein said metal end plates at opposite ends of said stacked array are coated over the face thereof proximate to the cells adjacent thereto and facing said cells, the sides thereof and a portion of the axial end face of said metal end plates opposite those facing said stacked array of cells, with a thin coating which is resistant to corrosion of at least one of the materials forming said electrodes and said electrolyte.

4. The bipolar battery as claimed in claim 3, wherein the end plates, the electrode cups, the thermal-sprayed metal layer and the thermal-sprayed ceramic layer have coefficients of thermal expansion sufficient to maintain sealing.

5. The bipolar battery as claimed in claim 1, wherein the thermal-sprayed ceramic layer and said thermal-sprayed metal layer each contains one of a material and a mixture of materials having different coefficients of thermal expansion (CTE) such that the coefficient of thermal expansion across the thickness of said ceramic sealant and metal support and containment structure varies gradually from the ceramic layer to the metal layer.

6. The bipolar battery as claimed in claim 1, wherein, for each cell, the electrodes are constituted by a cathode comprising $FeS_2$ and an anode comprising LiAl, said a thermal-sprayed ceramic layer comprising MgO and said thermal-sprayed metal comprises 410 stainless steel.

7. The bipolar battery as claimed in claim 6, wherein said thermal-sprayed MgO ceramic layer is of 20 mil thickness and said thermal-sprayed 410 stainless steel metal layer is of 50 mil thickness.

8. The bipolar battery as claimed in claim 6, further comprising a thermal-sprayed layer of Mo applied to the thermal-sprayed ceramic layer to protect the thermal-sprayed outer metal layer from corrosion by a material of at least one of the anode, the cathode, and said electrolyte 9. A bipolar battery as claimed in claim 1, wherein the thermal-sprayed ceramic layer comprises MgO, the metal parts, including the thermal-sprayed metal layer, comprises one material of the group consisting of 410 stainless steel and hastelloy B, having a coefficient of thermal expansion (CTE) near that of MgO, the anodes are formed of LiAl, the cathodes are formed of $FeS_2$ and at least one electrode of each cell is enclosed in a metal cup of 410 stainless steel.

10. The bipolar battery as claimed in claim 9, wherein, for each cell, the anode and cathode are enclosed in a metal cup coated with a conductive material that is resistant to the corrosive effects of $FeS_2$.

11. The bipolar battery as claimed in claim 1, wherein the thermal-sprayed ceramic layer comprises AlN and the thermal-sprayed metal layer comprises Mo, at least one electrode is enclosed in a Mo cup, said end plates are Mo and the thermal-sprayed outer layer is Mo.

12. The bipolar battery as claimed in claim 1, further comprising a means external of the stacked array on the end plates for maintaining compressive force throughout the stacked array during operation of the battery.

13. The bipolar battery as claimed in claim 1, wherein the thermal-sprayed ceramic layer is one material of the group consisting of $Li_2S$, CaS, SrS, BaS, $Li_2O$, BeO, MgO, CaO, SrO, $Ba_2O$, $Li_3N$, $Be_3N_2$, $Mg_3N_2$, $Ca_3N_2$, $Sr_3N_2$, $Si_3N_4$, BN, AlN, and mixtures thereof.

14. The bipolar battery as claimed in claim 13, wherein said electrolyte comprises alkali and alkaline earth metal salts and mixtures of the same.

15. The bipolar battery as claimed in claim 13, wherein said electrolyte comprises alkali halides containing a substantial portion of a lithium halide of the group consisting of LiCl-KCl, LiF-LiCl-LiBr, and LiCl-LiBr-KBr.

16. The bipolar battery as claimed in claim 6, wherein said electrolyte further comprises MgO as a binder.

17. The bipolar battery as claimed in claim 1, wherein said electrolyte separator comprises a compressed powder pellet.

18. The bipolar battery as claimed in claim 1, wherein said cathode comprises a transition metal sulfide or oxide of the group consisting of $V_2O_5$, $TiO_2$, $LiCo_2$, $LiNiO_2$, $TiS_2$, $FeS_2$, $FeS_2$, $NiS_2$, $CoS_2$, NiS, CoS and mixtures thereof in either the charged or uncharged state.

19. The bipolar battery as claimed in claim 1, wherein said at least one metallic current collector positioned intermediate of said adjacent cells of said stacked array comprises a metal diaphragm having a detent portion permitting buckling of the metallic current collector to follow the volumetric change reduction in size of the electrode at one side thereof during charging and discharging cycles of said bipolar battery during use of the same at high temperature.

20. The bipolar battery as claimed in claim 19, wherein said at least one metallic current collector plate interposed between adjacent cells of the stacked array comprises two superimposed metallic current collector plates having radially aligned interlocking detent portions to facilitate the maintenance of the cell components of the stacked array in axial alignment.

21. The bipolar battery as claimed in claim 2, wherein said metal cups each include peripheral portions projecting radially from the electrodes carried thereby and embedded in the thermal-sprayed ceramic sealant layer.

22. The bipolar battery as claimed in claim 21, wherein said metal cups have a peripheral side wall including an outwardly oblique portion flaring away from the periphery of an electrode carried thereby and extended within said thermal-sprayed ceramic sealant layer to facilitate mechanical bonding of the thermal-sprayed ceramic layer to the stacked array of cells of the bipolar battery.

23. The bipolar battery as claimed in claim 1, further comprising screens interposed respectively between the electrolyte separator and the anode and cathode to minimize particle migration from the electrode separator to the anode and cathode on opposite sides of said electrolyte separator.

24. The bipolar battery as claimed in claim 23, wherein the metallic current collectors and said screens have peripheral portions thereof extending radially outwardly of the stacked cell array radially beyond the electrodes and the electrolyte separator, and being embedded within said thermal-sprayed ceramic sealant layer to facilitate the mechanical bond between the thermal-sprayed ceramic layer and the components of the stacked array of cells forming the bipolar battery.

* * * * *